Aug. 6, 1957

A. T. STARR ET AL 2,802,170

ELECTRO-MAGNETIC SWITCHES

Filed July 31, 1952

4 Sheets-Sheet 1

*Inventors*
A. T. STARR—H. GRAYSON—
R. A. G. DUNKLEY—T. H. WALKER

By
*Attorney*

Aug. 6, 1957 A. T. STARR ET AL 2,802,170
ELECTRO-MAGNETIC SWITCHES
Filed July 31, 1952 4 Sheets-Sheet 2
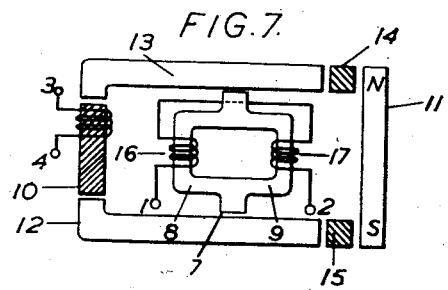
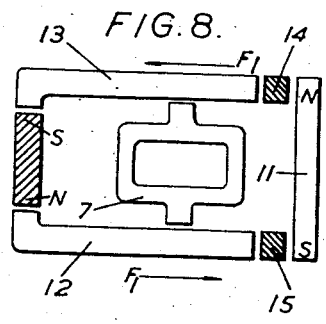
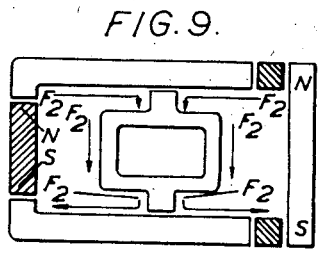
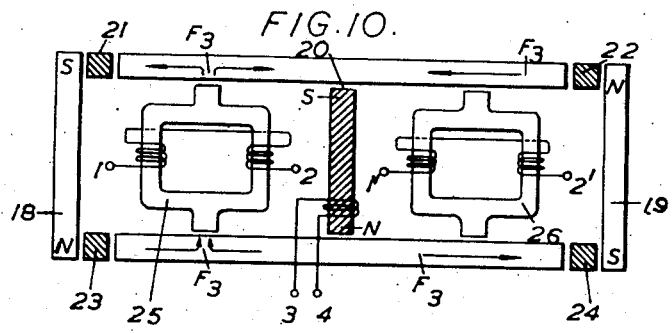
Inventors
A. T. STARR—H. GRAYSON—
R. A. G. DUNKLEY—T. H. WALKER
By Robert Harding
Attorney

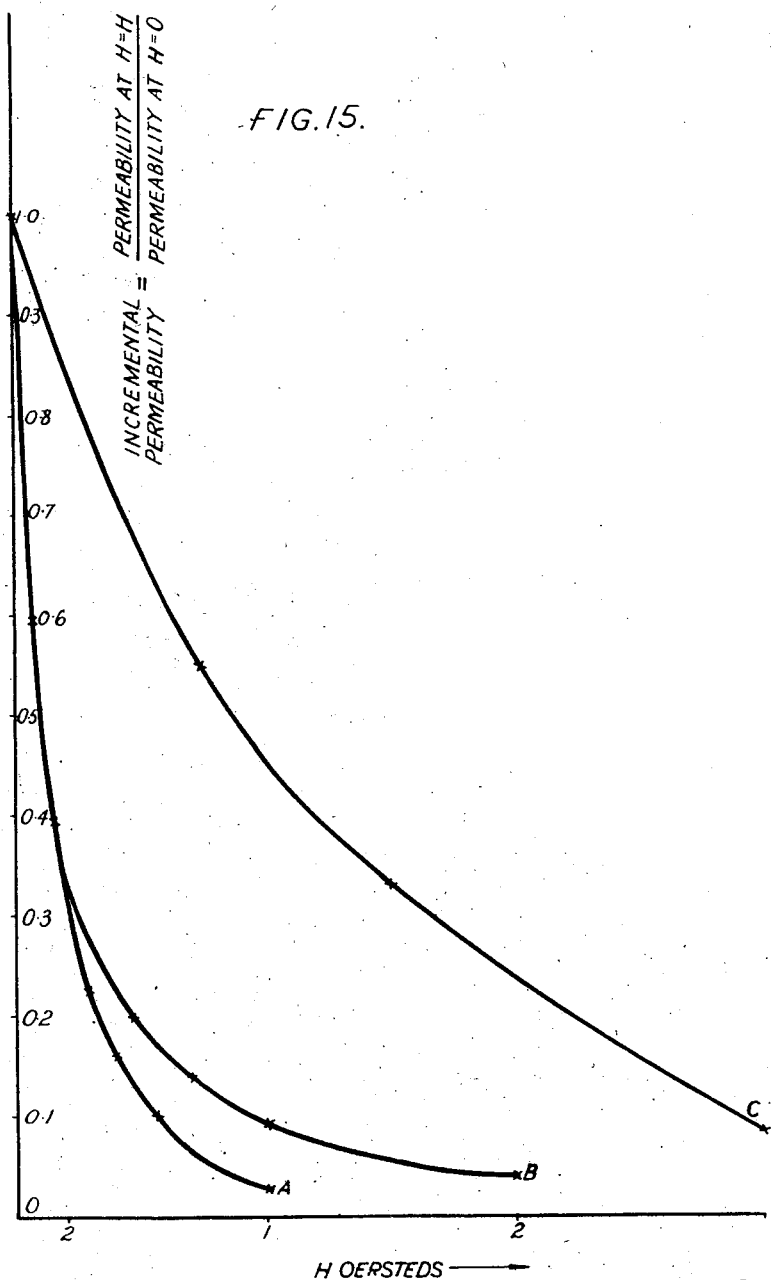

United States Patent Office 2,802,170
Patented Aug. 6, 1957

2,802,170

ELECTRO-MAGNETIC SWITCHES

Arthur Tisso Starr, Harry Grayson, Rowland Arthur George Dunkley, and Thomas Harold Walker, London, England, assignors to International Standard Electric Corporation, New York, N. Y., a corporation of Delaware Application July 31, 1952, Serial No. 301,894

Claims priority, application Great Britain August 1, 1951

13 Claims. (Cl. 323—92)

This invention relates to magnetic control devices which are particularly though not exclusively suitable for control of the transmission of alternating currents, including voice frequencies, and has for its object a device which uses little power and requires little maintenance.

The main feature of the invention comprises a magnetic control device having a magnetic circuit, electromagnetic control means for changing the distribution of magnetic flux in said magnetic circuit respectively from a first condition to a second condition substantially different from one another, and from said second condition to said first condition, and magnetic means for maintaining the distribution of magnetic flux in said magnetic circuit in said first condition or said second condition independent of said electro-magnetic control means.

Figure 11:
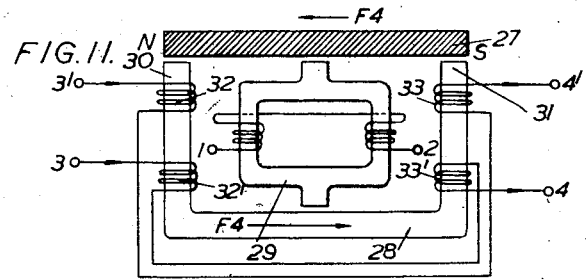
Figure 12:
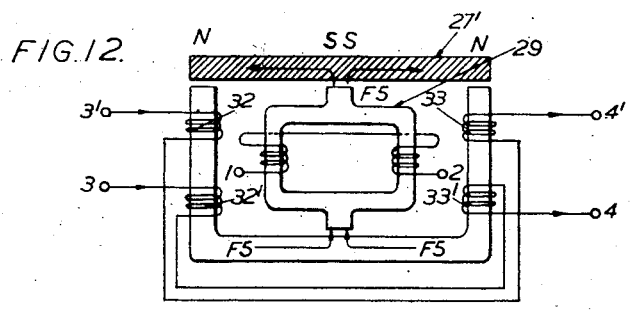
Figure 13:
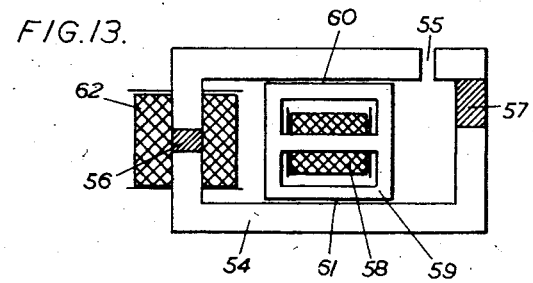
Figure 14:
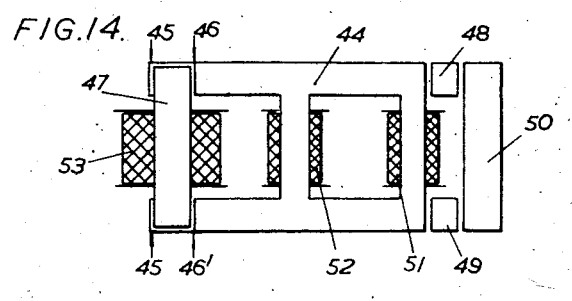

Various embodiments will be described with reference to the accompanying drawings in which:

Figs. 1, 2, 3 and 4 illustrate the principle of the invention,

Fig. 5, Fig. 6, Figs. 7, 8 and 9, Fig. 10, and Figs. 11 and 12 show schematically various embodiments of the invention, Figs. 13 and 14 each show in detail a static electrical switch constructed according to the invention, Fig. 15 shows the magnetic characteristics of certain soft magnetic materials suitable for use in the switches of Figs. 13 and 14.

Figs. 16–21 show various filter circuits for voice frequency switching employing static electrical switches embodying the invention.

In certain of the embodiments to be described three kinds of magnetic materials are used. Firstly a material, possessing good remanent properties is used, such materials will be referred to broadly as "strong permanent magnetic" materials. Examples of materials of this type are that known as "Alnico" having the composition 63% iron, 20% nickel, 5% cobalt and 12% aluminum, and that known as Ticonel containing iron, cobalt, nickel and titanium and that known as Alcomax.

Secondly a material is used of low coercivity, but otherwise possessing in some measure the properties associated with permanent magnetism. A number of steels fulfils this requirement, in particular spring steel and cobalt steel. Such materials will be referred to broadly as "weak permanent magnetic" materials.

Finally a material of high permeability is used, such materials will be referred to broadly as "soft magnetic" materials. Examples of soft magnetic materials are that known as Permalloy "C," which comprises 77.4% nickel, 13.3% iron, 0.6% manganese, 5% copper and 3.7% molybdenum; that known as Supermalloy, comprising 79% nickel, 15.4% iron, 0.6% manganese, and 5% molybdenum, that known as Perminvar comprising 45% nickel, 29.4% iron, 0.6% manganese and 25% cobalt; and those known as Swedish iron, Mumetal and Ferrox cube.

It should be noted that the distinction between strong and weak permanent magnetic materials lies only in the relative extent to which they possess magnetic characteristics, and a material which is the strong permanent magnetic material in one switch, could be the weak material in another, depending on what material is used in each case for the weaker, respectively stronger, permanent magnetic material.

Figure 1:
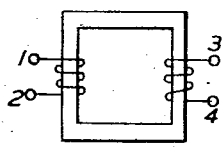
Figure 2:
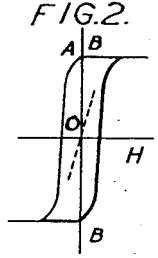

Fig. 1 shows an inductane, comprising a closed magnetic core on which are mounted a control coil 3, 4 and a controlled coil 1, 2. The controlled coil 1, 2 forms part of an associated transmission circuit. The closed core of the inductance can be of the soft magnetic material known as Supermalloy. Fig. 2 shows in full lines the hysteresis loop of the core material under large reversals of magnetising field (or control current): the dotted line is the B–H curve for small magnetising forces if the material is initially unmagnetised.

Let us suppose that condition O is when the material is unmagnetised. The inductance of coil 1, 2 is high.

Figure 3:

To switch to condition A all that is necessary is that a control current of the form shown in Fig. 3, shall be applied to the control winding 3, 4. Then the core material takes position A on the B–H curve and rests there. The inductance of coil 1, 2 is low proportional to the slope of B–H curve at A.

Figure 4:

To return from condition A to condition O it is necessary to apply control current of the waveform shown in Fig. 4.

The control waveforms shown in Figs. 3 and 4 can be reversed, together or separately, without altering the action.

A second method has been devised to avoid the necessity of a control waveform of the kind shown in Fig. 4: it also permits of a much higher ratio of inductances because of the use of different materials for the core of the alternating current circuit 1, 2 and for the core of the control circuit 3, 4.

Figure 5:
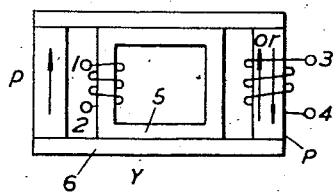
Figure 6:
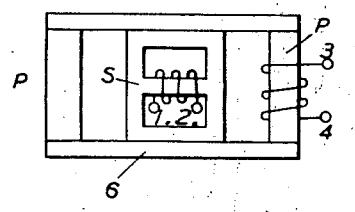

Such inductances are shown in Figs. 5 and 6, each comprising an internal rectangular closed magnetic core 5 carrying one winding, and an external closed magnetic core 6 closely embracing two parallel sides of the internal core and carrying a second winding. As shown the internal core carries the controlled winding 1, 2, and the external core carries the control winding 3, 4. The side limbs P of the control core 6 are of magnetic materials that have a coercive force, i. e. of the materials previously described as "strongly permanently magnetic." Suppose the left limb is permanently magnetised so that the magnetic flux is upwards. The right limb has two possible magnetic conditions. It can be magnetised upwards or downwards, by the control winding 3, 4. The control pulse is a positive or a negative pulse of current of the form shown in Fig. 3. If the right limb is magnetised upwards, the flux from each limb P is forced to go downwards through the side of the central core 5, which is made of a soft magnetic material. The result is a low inductance between the terminals 1, 2.

The external core 6 is of permanent magnetic material and the internal core 5 is of soft magnetic material. The cores must be closely coupled, but can be transposed. If the right limb P of external core 6 is magnetised downwards by coils 3, 4, the flux circulates round the limbs P and the yokes Y, only the difference of the fluxes in the limbs passing through the internal core 5. In this condition the inductance is high.

The internal core 5 must be complete in itself to avoid the necessity of a control waveform as shown in Fig. 4.

Fig. 6 shows an arrangement in which control pulses do not leak through into the controlled winding 1, 2, and which may be useful in some applications. The internal core 5 has three horizontal limbs, the centre one of which carries the inductance 1, 2. The limb, carrying coil 1, 2, does not carry flux.

Referring again to Fig. 5, it will be seen that when the switch is in its "off" condition there is ideally no flux through the soft core 5. This would only be achieved if the permanent magnets P were of exactly equal strengths. However, even if this were so initially, a control pulse in the winding 3, 4 would increase the strength of the reversible magnet thus destroying the balance for the duration of the pulse. This increase of strength would tend to reduce the strength of the non-reversible permanent magnet so that a balanced condition would not be re-created.

In order to facilitate the preservation of this balance, in the embodiment of the invention shown in Fig. 7 the constant flux is supplied by a magnet 11 which is of a strong permanent magnetic material and is much more powerful than the reversible magnet 10 which is of a relatively weak permanent magnetic material. Flux flows from these magnets through the yoke-pieces 12 and 13 to the portion 7 of soft magnetic material. The controlled coil 1, 2 is wound in two parts 16 and 17 on the limbs 8 and 9 of the portion 7. The coils 16 and 17 have equal numbers of turns so that the inductive coupling between the control coil 3, 4 and the combined controlled coil 1, 2 forming part of an associated transmission circuit, is substantially zero.

Suppose now that current is passed through the control coil 3, 4 so as to pole the reversible magnet 10 in the sense shown in Fig. 8. Because of the relative poling of the two magnets flux flows mainly through the yoke-pieces 12 and 13 as indicated by the arrows $F_1$ of Fig. 8. Very little flux flows through the portion 7 of soft magnetic material. When the control current is switched off this state persists. However, the flux through the member 7 can now be reduced substantially to zero by suitable sizing of the non-magnetic spacers 14 and 15.

In this condition, while the flux due to the magnet 11 at the junctions of the portion 7 with the yoke-pieces 12 and 13 is equal to that due to the magnet 10 so that a line passing through these junctions may be considered to be an axis of magnetic symmetry. The relative strengths of the magnets are such that together with the high reluctance of the gaps at 14 and 15 the effect upon the field of the powerful magnet 11 of changes in the field of the relatively weak magnet 10 is negligible.

A current pulse in the control winding 3, 4 of opposite sense to that mentioned above will reverse the polarity of the magnet 10. The flux will now flow through the member 7 as indicated by the arrows $F_2$ in Fig. 9.

Fig. 10 shows the invention applied to a double-pole switch used to control two associated alternating current circuits. In this case if one of two controlled coils is in the "on" condition the other is in the "off" condition and vice versa. In the embodiment shown flux is supplied by two powerful permanent magnets 18 and 19. A current pulse in the control winding 3, 4 determines the direction of magnetisation of the weak reversible magnet 20. Four non-magnetic spacers 21, 22, 23 and 24 are employed for balancing purposes in the manner already described. In the condition shown in the drawing, the poling of the reversible magnet is such as to saturate the member 25 of soft material, the flux path being indicated by the arrows $F_3$. The inductance of the switched coil 1, 2 is low.

Since substantially no flux reaches the member 26 of soft material, the inductance of the switched coil $1^1$, $2^1$ is high. The switch remains in this condition until a control pulse of the opposite sense matures across 3, 4.

Fig. 11 shows the invention applied to a single pole switch but without the use of a powerful permanent magnet, the flux being derived entirely from a weak magnet 27. The weak magnet is in this case never fully reversed but has nevertheless two distinct magnetic conditions. In the condition shown in Fig. 11 the flux circulates through the magnet 27 and the yoke 28 as indicated by the arrows $F_4$. The member 29 of soft magnetic material being unsaturated, the inductance of the switched coil 1, 2 is high, therefore switch is in its "off" condition.

If now a current pulse passes between 3 and 4, the extremity $27^1$ of the magnet 27 will be constrained to change its polarity and flux will flow as indicated by the arrows $F_5$ of Fig. 12 so as to saturate the member 29 thus causing its inductance to fall so that the switch is "on."

The switch will remain in this condition until a pulse matures across the control winding $3^1$, $4^1$. While the coils 32 and $32^1$ of the windings 3, 4 and $3^1$, $4^1$ are wound in the same sense on the member 30 of the yoke 28, the corresponding coils 33 and $33^1$ on the member 31 are wound in opposite senses. Thus, while the polarity of the member 30 is unchanged that of the member 31 is reversed and the magnet 27 returns to its original condition as shown in Fig. 11 so that the switch is once more in its "off" condition.

The details of the construction of a particular switch will now be described with reference to Fig. 13. The switch shown is of the type whose operation has already been explained with reference to Fig. 6. The yoke 54 was of Swedish iron with an adjustable air gap at 55. Sections 56 and 57 were inserted in the yoke being respectively .08 inch and .46 inch, in length and were of the strong permanent magnetic material known as Ticonel. The controlled coil 58 had 300 turns and was wound on a core built up from .005 inch laminations of Mumetal. The contacting surfaces of Mumetal and Swedish iron at 60 and 61 were ground flat and were in extremely close contact. The control coil 62 had 1500 turns.

On assembling the switch, the air gap 55 was closed and the section 57 was magnetised by passing current through a coil placed around the section. About 1200 ampere turns were required. The air gap 55 was opened to about .008 inch so as to demagnetise the magnet 57 to some extent. Current was passed through the control coil 62 so as to put the switch into the "off" position. The air gap was then reduced until the inductance of the switched coil was a maximum. Opening the air gap more than necessary and then closing it to obtain a flux balance ensured that the magnet was working on a reversible portion of its hysterises loop. The following performance figures were measured in the above case:

Inductance of switched coil 58, switch in "off" condition _____ mh__ 330
D. C. resistance of switched coil 58_____ohms__ 3.5
D. C. resistance of control coils 62_____do____ 200
A. C. volts required just to saturate switched coil 58 in "off" state at 2 kc./s_____volts peak to peak__ 80

The switch ratio, that is the ratio of the inductance of the switched coil in the "off" condition to its inductance in the "on" condition, was measured for various values of the control current pulse applied to the switch in its off condition. The ratio was measured with 1 volt peak to peak at 2 kc./s. feeding a circuit comprising the switched coil in series with a resistance of 51 ohms. The following results were obtained:

| Current Pulse, ma. | Switch Ratio |
|---|---|
| 20 | 1 |
| 50 | 1 |
| 100 | 1 |
| 150 | 1 |
| 200 | 3 |
| 250 | 34 |
| 300 | 56 |
| 350 | 58 |
| 400 | 58 |

The construction of a second type of switch will now be described with reference to Fig. 14. The switch shown is of the type whose operation has already been described with reference to Fig. 7. In a particular case the core 44 was built up from fifty-one .005 inch lamination of Mumetal. Alternate layers extended to 45, 45¹ while the intermediate ones extended only to 46, 46¹. It was thus possible to interleave the Mumetal laminations with twenty-five .005 inch laminations of spring steel to form the reversible magnet 47. This laminated construction was adopted in order to reduce the total effective air gap in the magnetic circuit and to reduce eddy current losses which would otherwise be particularly serious at high switching speeds. As has already been explained, the non-magnetic spacers 48 and 49 are chosen to be of appropriate size to produce flux balance. It has been found necessary for these spacers to be between .5 and 1 cm. wide according to the strength of the permanent bar magnet 50. It was not necessary to adopt a laminated construction for this member.

The switched coil consisted of two windings 51 and 52 each of 300 turns. If the switch is to be switched on and switched off by pulses of opposite polarity then only one control winding 53 is required, in the case considered 1500 turns were employed. If switching on and switching off is to be controlled by pulses of the same polarity then two counter-wound control coils each of 1500 turns would be required at 53. The overall dimensions of the switch were approximately 2½" x 1¼" x ¼". The inductance of the switched coil 51, 52 was found to be 450 mh. when the switch was in its "off" condition. The following values of the switch ratio (as already defined) were measured using an alternating current of frequency 1 kc./s.

| Current Pulse, ma. | Switch Ratio |
|---|---|
| 30 | 6 |
| 50 | 16 |
| 70 | 21 |
| 100 | 28 |
| 200 | 32 |

The choice of materials for the various parts of the magnetic circuit of a switch such as those described above will depend upon the use to which the switch is to be put. Generally in application such as telephone switching, where the highest possible switching ratio is required, the criterion for the choice of the soft material is the variation of the incremental permeability with the D. C. polarising field. The behaviour of three materials which show a rapid reduction in incremental permeability with increasing polarising field is shown in Fig. 15. The incremental permeability has been plotted against polarising field strength, curves A, B and C referring respectively to the alloys known as Permalloy "C," Mumetal and Ferroxcube III. It will be seen that Permalloy "C" has the preferable characteristic. The characteristic of the material known as Supermalloy is considerably better.

Materials having a rectangular, or perferably a square hysteresis loop are required for the weak reversible magnet.

In some applications it may be convenient to enhance the switching ratio of the devices described by including a number of them in filter networks. Such networks are shown in Figs. 16–21 in which the symbol ⌐ is used to indicate that the corresponding inductance must have its low value if the filter circuit is to be in its "pass" condition and its high value if the circuit is to be in its "stop" condition. The symbol ⌐ indicates that the appropriate inductance must be high for the "pass" condition of the filter circuit and low for the stop condition.

Figure 16:
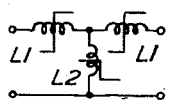
Figure 17:
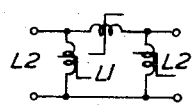

In Figs. 16 and 17 there is a potentiometer effect. In the pass condition the series impedances are low and the shunt impedance is high while in the stop condition the series impedances are high and the shunt impedance is low.

This circuit is analysed below. The T and $\pi$ networks behave in almost exactly the same way. Suppose that in the pass condition the inductances are $L_1$ and $L_2$, the loss can be made 0.1 db at 1 kc./s. and rise to 0.35 db at 300 c./s. and 3.4 kc./s. if $L_2 = 80L_1$ and $R = \omega_0\sqrt{(2L_1L_2)}$ where $\omega_0 = 2\pi \times 1$ kc./s. If in the stop condition the inductances become $nL_1$ and $L_2/n$, then minimum loss occurs at 300 c./s. and the insertion loss factor (power) is approximately $n^6(L_1/2L_2)^3/10 = n^6/4.10^7$.

| Minimum Loss, db | 60 | 70 | 80 |
|---|---|---|---|
| $n$ | 185 | 270 | 400 |

Figure 18:
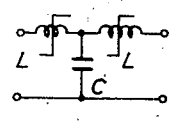

In Fig. 18 the circuit is a low pass filter allowing the audio band through in the pass condition. In the stop condition the cut off frequency is well below the audio band.

This circuit is also analysed below. The action may be explained as follows: When the inductances are small, the cut off is above the audio band and there is small loss: when the inductances are high, the cut-off is below the audio band and the loss is large.

It is shown that if the loss has a maximum value of 0.25 db inside the band and 0.35 db at $\omega_1 = 2\pi \cdot 3.4$ kc./s., then $$\omega_1 L/R = 1.42 \text{ and } \omega_1 CR = 1.18$$

The nominal cut-off frequency is 3.7 kc./s.

It is then found that the following values of $n$ are needed for various attenuations at 300 c./s.

| Attenuation (db) | 60 | 70 | 80 |
|---|---|---|---|
| $n$ | 1,200 | 2,000 | 3,500 |

It is seen that much larger values of $n$ are needed than in the potentiometer method. This is due to 2 reasons. Firstly, the cut-off frequency varies as $1/\sqrt{n}$, and not as $1/n$, in a case where the capacitances are constant. Secondly, only two variable elements are used.

Much smaller values of $n$ would be needed if three variable elements were used in a two-section low pass filter.

Figure 19:
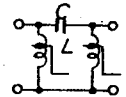

Fig. 19 shows a high pass filter allowing the audio band through in the pass condition. In the stop condition the cut-off frequency is well above the audio band.

It is found that the results are much as for the low pass filter, but the minimum loss is at 3.4 kc./s. The values of $n$ required are approximately the same as for the low pass filter case.

Figure 20:
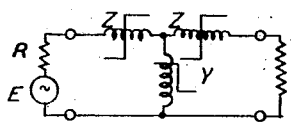
Figure 21:
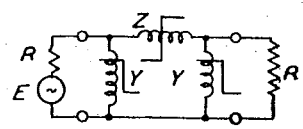

Figs. 20 and 21 show the T and $\pi$ potentiometer networks of Figs. 16 and 17 terminated in resistances R. It is easily shown that the insertion loss factor is $$F = (1+Z/R)(1+\tfrac{1}{2}YR+\tfrac{1}{2}YZ), \text{ T network}$$
$$F = (1+YR)(1+\tfrac{1}{2}Z/R+\tfrac{1}{2}YZ), \pi \text{ network}$$

T network

In pass condition $Z = j\omega L_1$, $Y = 1/j\omega L_2$, whilst in the stop condition $Z = nj\omega L_1$, $Y = n/j\omega L_2$. It follows that $$F_{\text{pass}} = (1+j\omega L_1/R)(1+L_1/2L_2+R/2j\omega L_2) \quad (1.1)$$

or $$|F^2|_{\text{pass}} = (1+\omega^2 L_1^2/R^2)[(1+L_1/2L_2)^2 + R^2/4\omega^2 L_2^2]$$

and $$|F^2|_{\text{stop}} = (1+n^2\omega^2 L_1^2/R^2)[(1+n^2 L_1/2L_2)^2 + n^2 R^2/4\omega^2 L_2^2] \quad (1.2)$$

We may write $$|F^2|_{\text{pass}} = (1+L_1/2L_2)^2 + L_1^2/4L_2^2 + R^2/4\omega^2 L_2^2 + (1+L_1/2L_2)^2 \omega^2 L_1^2/R^2$$

This has a minimum value at $\omega_0$ where $$\omega_0^2 2L_1L_2(1+L_1/2L_2) = R^2 \quad (1.3)$$

and then
$$|F^2|_{pass}=(1+L_1/L_2)^2+(L_1/2L_2)(1+ \quad (1.1a)$$
$$L_1/2L_2)(\omega/\omega_0-\omega_0/\omega)^2$$
$$|F^2|_{stop}=(1+n^2L_1/L_2+n^4L_1^2/2L_2^2)$$
$$+(1+n^2L_1/2L_2)^2n^2(L_1/2L_2)(1+$$
$$L_1/2L_2)^{-1}\omega^2/\omega_0^2)$$
$$+n^2(L_1/2L_2)(1+L_1/2L_2)\omega_0^2/\omega^2 \quad (1.2a)$$

$|F^2|_{pass}$ has a minimum value of $(1+L_1/L_2)^2$ at $\omega_0$, and the value has geometric symmetry about this frequency. We then take $\omega_0=\sqrt{(\omega_1\omega_2)}$ where $\omega_1=\cdot 300$ c./s. and $\omega_2=2\pi\cdot 3.4$ kc./s., so that $\omega_0=2\pi\cdot 1.00$ kc./s. If there is to be 0.1 db loss at $\omega_0$, $F^2_{min}=1.025$, so that $L_1/L_2=\frac{1}{2}(.025)$, i. e. $L_2=80L_1$. In this case we can write $$|F^2|_{pass}=(1+L_1/L_2)^2+L_1/2L_2)(\omega/\omega_0-\omega_0/\omega)^2 \quad (1.1b)$$
and
$$|F^2|_{stop}=(1+n^2L_1/L_2+n^4L_1^2/2L_2^2)$$
$$+(n^2L_1/2L_2)(1+n^2L_1/2L_2)^2\omega^2/\omega_0^2$$
$$+(n^2L_1/2L_2)(\omega_0^2/\omega^2) \quad (1.2b)$$

The pass factor at $\omega=2\pi(300$ c./s. or 3.4 kc./s.) is
$$|F^2|_{pass}=1.025+(1/160)(10)=1.087, \text{ or } 0.35 \text{ db}$$

The minimum value of $|F^2|_{stop}$ occurs at
$$\omega=\omega_0(1+n^2L_1/2L_2)^{-1/2}=\omega_0^{3/n}$$

In any useful case this is below 300 c./s., so that the minimum in the band is at 300 c./s. Then
$$|F^2|_{stop\ min.}=(n^2L_1/2L_2)^3/10$$

This is 70 db if $n=270$.

π network $$|F^2|_{pass}=(1+R^2/\omega^2L_2^2)[(1+L_1/2L_2)^2+\omega^2L_1^2/4R^2]$$
$$=(1+L_1/2L_2)^2+L_1^2/4L_2^2+$$
$$(1+L_1/2L_2)^2R^2/\omega^2L_2^2+\omega^2L_1^2/4R^2$$
$$=(1+L_1/L_2)^2+(L_1/2L_2))1+$$
$$L_1/2L_2)(\omega/\omega_0-\omega_0/\omega)^2$$
where $\omega_0^2L_1L_2=2R^2(1+L_1/2L_2)$. $\quad (1.4)$ As $L_1/2L_2\ll 1$, the formulae for the pass condition are as for the T network. Thus $L_2=80L_1$ for a minimum attenuation of 0.1 db at 1 kc./s. rising to 0.35 db at the edges of the band.

$$|F^2|_{stop}=(1+n^2/2L_2)^2+n^4L_1^2/4L_2^2$$
$$+(1+n^2L_1/2L_2)^2(n^2L_1/2L_2)(1+L_1/2L_2)\omega^2/\omega_0^2$$
$$+(n^2L_1/2L_2)(1+L_1/2L_2)\omega^2/\omega_0^2$$

This is almost the same as for the T network, and the same conclusions follow.

The low pass filter circuit of Fig. 18 will now be discussed. In the pass condition $Z=j\omega L$ and $Y=j\omega C$ whilst in the stop condition $Z=nj\omega L$ and $Y=j\omega C$.

In the pass condition
$$F=(1+j\omega L/R)(1-\frac{1}{2}\omega^2LC+\frac{1}{2}j\omega CR)$$
and
$$|F^2|=(1+\omega^2L^2/R^2)[(1-\frac{1}{2}\omega^2LC)^2+\frac{1}{4}\omega^2C^2R^2]$$

We have two parameters at our disposal, viz. L/R and CR. A reasonable choice is to fix the attenuation at $\omega_0=2\pi\cdot 3.4$ kc./s. as 0.35 db and a maximum attenuation of 0.25 db inside the band.

Stationary attenuation inside the band occurs when
$$(L^2/R^2)[(1-\frac{1}{2}\omega^2LC)^2+\frac{1}{4}\omega^2C^2R^2]+$$
$$(1+\omega^2L^2/R^2)[-LC(1-\frac{1}{2}\omega^2LC)+\frac{1}{4}C^2R^2]=0$$

There is a maximum at $\omega^2=\frac{1}{3}(2/LC-R^2/L^2)$ and a minimum at $\omega^2=(2/LC-R^2/L^2)$. It is found that $$|F^2|_{max}=(\frac{8}{27})(1+L/CR^2)(1+7CR^2/8L-C^2R^4/8L^2)$$

If this is to correspond to 0.25 db, i. e. $|F^2|=1.06$, it is found that $L/CR^2=1.2$. The condition of 0.35 db attenuation at $\omega_1=2\pi\cdot 3.4$ kc./s. gives $$1.083=(1+\omega_1^2L^2/R^2)[(1-\frac{1}{2}\omega_1^2LC)+\frac{1}{4}\omega_1^2C^2R^2]$$
$$=(1+1.2\omega_1^2LC)[(1-\frac{1}{2}\omega_1^2LC)+\omega_1^2LC/4.8]$$
$$=1+0.408x-0.7x^2+0.3x^3$$

where $x=\omega_1^2LC$. It is found that $x=1.68$, so that
$$L/CR^2=1.2, \omega_1^2LC=1.68,$$
giving
$$\omega_1L/R=1.42, \omega_1CR=1.18$$

The nominal cut-off frequency of the low pass filter is $\omega_0=\sqrt{(2/LC)}=1.09\omega_1$, i. e. 3.71 kc./s.

In the stop condition
$$|F^2|=(1+n^2\omega^2L^2/R^2)[(1-\frac{1}{2}\omega^2nLC)^2+\frac{1}{4}\omega^2C^2R^2]$$
$$=(1+2n^2\omega^2/\omega_1^2)[(1-0.84n\omega^2/\omega_1^2)^2+0.35\omega^2/\omega_1^2]$$

At 300 c./s.
$$|F^2|=(1+0.0156n^2)[(1-0.0065n)^2+0.00271]$$
$$=0.0156n^2(1-0.0065n)^2$$
$$=6.6\cdot 10^{-7}n^2(n-154)^2$$

One thing emerges, and that is that $n$ must exceed 154: this is the factor so that the cut-off must be depressed below 300 c./s.

While the principles of the invention have been described above in connection with specific embodiments, and particular modifications thereof, it is to be clearly understood that this description is made only by way of example and not as a limitation on the scope of the invention.

What we claim is:

1. An electromagnetic control device comprising first and second separate magnetic circuits, said first circuit being in flux transfer relation with said second circuit, flux responsive utilization means coupled to said second circuit, said first circuit comprising a first magnetic biasing means for producing a flux in a given direction and a second magnetic biasing means for producing a flux in an aiding or opposing direction, the coercivities of said first and second magnetic circuits being such that when said first and second biasing means produce fluxes in aiding directions substantially no flux traverses said second circuit and when said biasing means produce fluxes in opposing directions substantially all of the flux traverses said second circuit and thereby render said utilization means responsive, said first circuit including means for maintaining traversal of said second circuit by said first flux after production of said second flux.

2. A magnetic control device as claimed in claim 1 in which said maintaining means comprises a length of magnetic material having a high coercive force and said second magnetic biasing means comprises electric coil means coupled to said first circuit and capable of magnetising said length of magnetic material in different directions.

3. A magnetic control device as claimed in claim 2 in which said second magnetic biasing means is arranged to magnetise said length of magnetic material as a whole in opposite directions, and in which the ends of said length only are coupled into said first magnetic circuit.

4. A magnetic control device as claimed in claim 3 in which said length of magnetic material is coupled into said first magnetic circuit at three points and in which said second magnetic biasing means is arranged to magnetise said length as a whole or in two parts defined by said coupling.

5. A magnetic control device as claimed in claim 2 in which said second magnetic biasing means is arranged to magnetise said length of magnetic material in opposite directions.

6. A magnetic control device as claimed in claim 2, and in which both said magnetic circuits comprise three magnetically parallel paths, a first one of which is constituted by said length of magnetic material carrying said electric coil means, a second one of which is constituted by a permanently energised length of magnetic material, and a third one of which is constituted by said second magnetic circuit and comprises a member of soft magnetic material, whereby the two directions of magnetisation of said first path respectively tend to cause and prevent the passage of said first flux from said second path through said third path.

7. A magnetic control device as claimed in claim 10 and further comprising non-magnetic spacers interposed respectively between each end of said second path and said first path, said second path having a high flux density compared with that to be generated in said first path by said coil means.

8. A magnetic control device as claimed in claim 4 and in which the remainder of said first magnetic circuit is of soft magnetic material and is E shaped with said length of magnetic material as a keeper.

9. A magnetic control device as claimed in claim 8 and in which said electric coil means comprises coils mounted on the two outer extremities of said E-shaped path so arranged as to allow of magnetising said length of magnetic material with end poles of the same or opposite polarity.

10. A magnetic control device as claimed in claim 3, wherein said first magnetic circuit comprises a pair of parallel limbs of soft magnetic material, said magnetic biasing means comprising a pair of permanent magnets, each bridging corresponding ends of said parallel limbs in opposite polarity, said means for producing said second flux disposed intermediate said magnets in flux transfer relation with said limbs, said second magnetic circuit comprising a pair of magnetic cores of soft magnetic material, each of said cores disposed on opposite sides of said flux producing means and in flux transfer relation with said limbs, said flux responsive utilization means comprising a plurality of additional electric coil elements, each element associated with a different one of said pair of magnetic cores.

11. A magnetic control device as claimed in claim 1 wherein said flux responsive utilization means comprises an electric coil winding having a normally relatively high impedance to the flow of electric current therethrough and which is adapted to have its impedance substantially lowered upon traversal of said second circuit by said first flux.

12. The device as claimed in claim 1 wherein said flux responsive utilization means comprises an electric coil winding wound about a lateral limb of said second circuit.

13. The device as claimed in claim 1 wherein said second magnetic circuit comprises a pair of parallel limbs and said utilization means comprises a separate winding for each of said limbs, each said windings wound in opposition to the other and series connected to cancel any electromagnetic coupling with said second flux producing means.

References Cited in the file of this patent

UNITED STATES PATENTS

| | | |
|---|---|---|
| 2,036,264 | Forbes | Apr. 7, 1936 |
| 2,040,768 | Edwards | May 12, 1936 |
| 2,053,154 | La Pierre | Sept. 1, 1936 |
| 2,218,711 | Hubbard | Oct. 22, 1940 |
| 2,560,284 | Grandstaff | July 10, 1951 |